(12) United States Patent
Yu et al.

(10) Patent No.: US 8,504,934 B1
(45) Date of Patent: Aug. 6, 2013

(54) DISPLAYING A GRAPHICAL KEYBOARD

(75) Inventors: Fan Yu, Beijing (CN); Huanjun Bao, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/599,885

(22) Filed: Aug. 30, 2012

(51) Int. Cl.
*G06F 3/14* (2006.01)

(52) U.S. Cl.
USPC ........... 715/773; 715/863; 345/173; 345/174; 345/473; 600/437; 200/5 A

(58) Field of Classification Search
USPC .......... 715/200–277, 700–867; 700/701–866; 709/201–229; 705/50–79; 345/30–111
See application file for complete search history.

(56) References Cited

U.S. PATENT DOCUMENTS

| | | | |
|---|---|---|---|
| 6,491,630 B1 * | 12/2002 | Saccardo et al. | 600/437 |
| 8,098,233 B2 * | 1/2012 | Hotelling et al. | 345/173 |
| 8,390,481 B2 | 3/2013 | Pance et al. | |
| 2009/0259969 A1 | 10/2009 | Pallakoff | |
| 2011/0141120 A1 * | 6/2011 | Platzer et al. | 345/473 |
| 2011/0197158 A1 * | 8/2011 | Tseng et al. | 715/773 |
| 2011/0314429 A1 * | 12/2011 | Blumenberg | 715/863 |
| 2012/0026110 A1 * | 2/2012 | Yamano | 345/173 |
| 2012/0075249 A1 * | 3/2012 | Hoch | 345/174 |
| 2012/0117506 A1 * | 5/2012 | Koch et al. | 715/773 |
| 2012/0138441 A1 * | 6/2012 | Kim et al. | 200/5 A |
| 2012/0188174 A1 * | 7/2012 | Migos et al. | 345/173 |

OTHER PUBLICATIONS

Wimmer, et al. "HandSense—Discriminating Different Ways of Grasping and Holding a Tangible User Interface", TEI 2009, Feb. 16-18, 2009, 4 pgs.
Hinckley, "Sensing Techniques for Mobile Interaction", UIST 2000 Proceedings of the 13th annual ACM symposium on User interface software and technology, 10 pgs.

* cited by examiner

*Primary Examiner* — Ruay Ho
(74) *Attorney, Agent, or Firm* — Shumaker & Sieffert, P.A.

(57) ABSTRACT

In general, this disclosure describes techniques for providing a mechanism for facilitating text entry by a user interacting with a graphical keyboard displayed at a presence-sensitive screen of a computing device. For example, a computing device having a presence-sensitive screen and a housing, the housing further having a plurality of touch sensors, receives touch input at the touch sensors. The computing device determines a usage mode, based on the touch input. The computing device also displays, based on the usage mode, a graphical keyboard at the presence-sensitive screen. If the usage mode is a one-handed usage mode, a unitary graphical keyboard is displayed. If the usage mode is a two-handed usage mode, a split graphical keyboard is displayed.

20 Claims, 6 Drawing Sheets

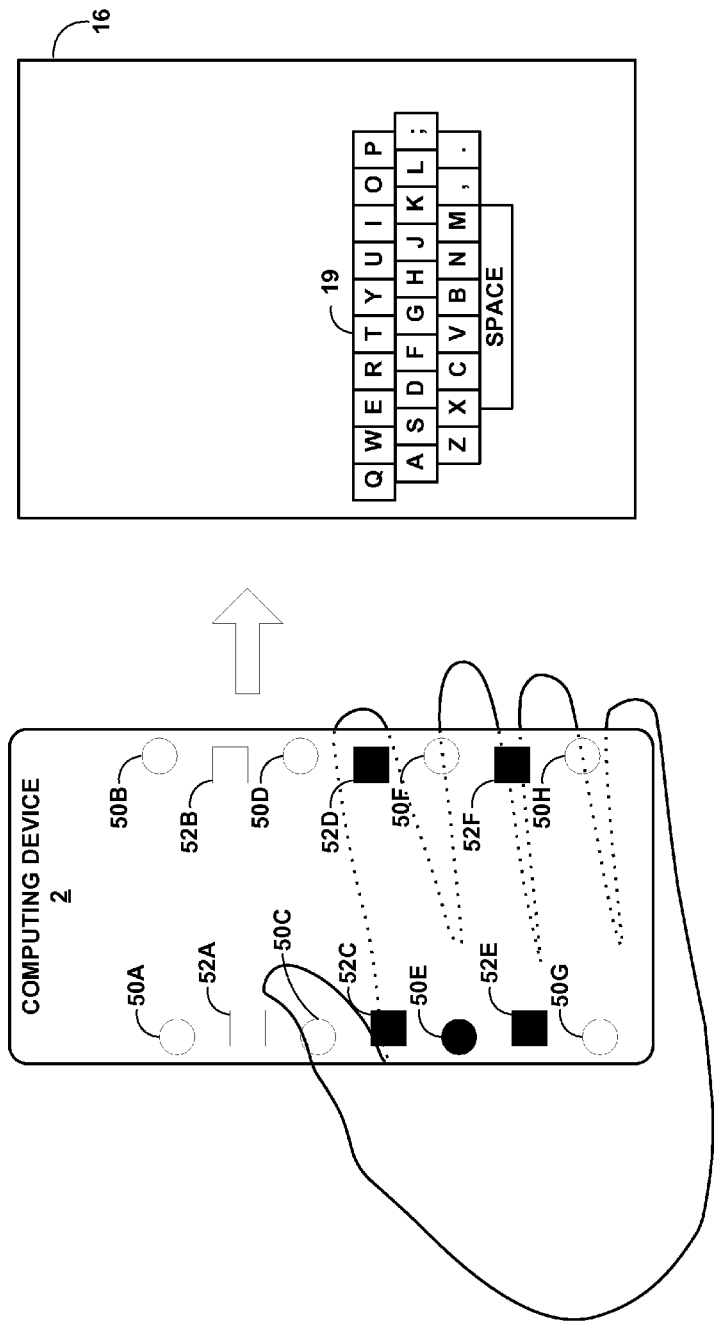

DISPLAYING A GRAPHICAL KEYBOARD

BACKGROUND

A user may interact with applications that are executing on a computing device (e.g., a mobile phone, tablet computer, smartphone, desktop computer, or similar device). In some examples, a computing device may include a presence-sensitive screen that may enable a user to interact with the computing device. For instance, an application executing on a computing device may cause a presence-sensitive screen to display a graphical keyboard that may enable a user to register key presses by touching certain areas of the graphical keyboard.

SUMMARY

In one example, a method includes receiving, by one or more touch sensors from a plurality of touch sensors at a housing of a computing device, a touch input, and determining, based at least in part on the touch input and by the computing device, a usage mode, wherein the usage mode includes at least one of a one-handed usage mode, and a two-handed usage mode. The method may also include displaying, based at least in part on the usage mode, a graphical keyboard at the presence-sensitive screen of the computing device, wherein, if the usage mode is the one-handed usage mode, the graphical keyboard is displayed as a unitary graphical keyboard, and wherein, if the usage mode is the two-handed usage mode, the graphical keyboard is displayed as a split graphical keyboard.

In another example, a computing device includes one or more processors, a presence-sensitive screen, a housing having a plurality of touch sensors, a usage mode module operable by the one or more processors and an interface manager operable by the one or more processors. The usage mode module is operable by the one or more processors to receive a touch input at one or more touch sensors from the plurality of touch sensors and determine, based at least in part on the touch input, a usage mode, wherein the usage mode includes at least one of a one-handed usage mode, and a two-handed usage mode. The interface manager is operable by the one or more processors to display, based at least in part on the usage mode, a graphical keyboard at the presence-sensitive screen, wherein if the usage mode is the one-handed usage mode, the graphical keyboard is displayed as a unitary graphical keyboard, and wherein, if the usage mode is the two-handed usage mode, the graphical keyboard is displayed as a split graphical keyboard.

In another example, a computer-readable storage medium is encoded with instructions that, when executed, cause one or more processors of a computing device to perform operations including receiving touch input at one or more touch sensors from a plurality of touch sensors included in a housing of the computing device, determining, based at least in part on the touch input, a usage mode, wherein the usage mode includes at least one of a one-handed usage mode, and a two-handed usage mode, and displaying, based at least in part on the usage mode, a graphical keyboard at a presence-sensitive screen of the computing device, wherein, if the usage mode is the one-handed usage mode, the graphical keyboard is displayed as a unitary graphical keyboard, and wherein, if the usage mode is the two-handed usage mode, the graphical keyboard is displayed as a split graphical keyboard.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 3A-3C are conceptual diagrams illustrating an example computing device for displaying a graphical keyboard at a presence-sensitive screen, in accordance with one or more aspects of the present disclosure.

DETAILED DESCRIPTION

Figure 1:
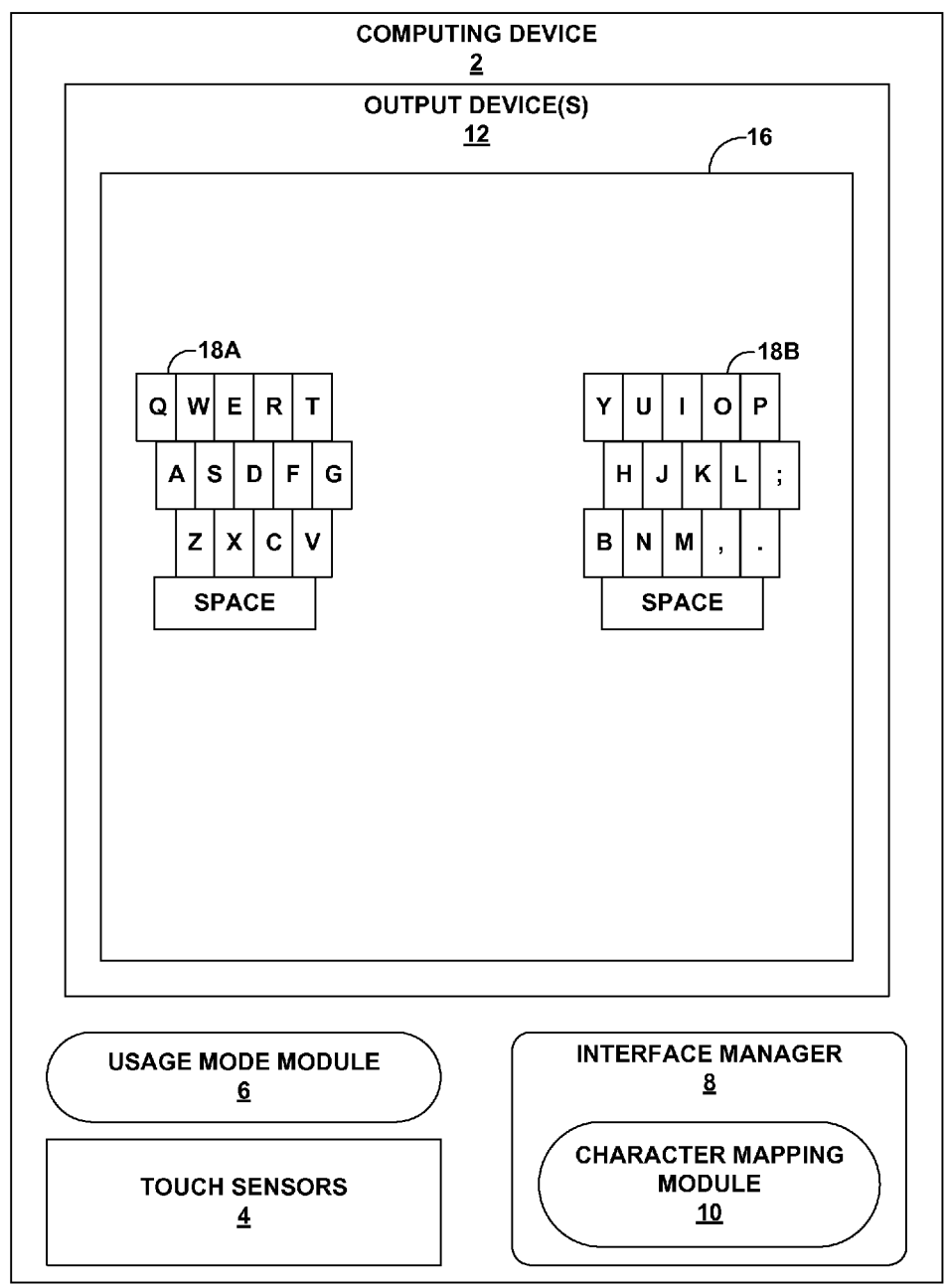
FIG. 1 is a conceptual diagram illustrating an example of a computing device that may be configured to execute one or more applications and receive input, in accordance with one or more aspects of the present disclosure.

The disclosure is directed to techniques for facilitating text entry by a user interacting with a graphical keyboard displayed at a presence-sensitive screen of a computing device. Many handheld mobile devices, such as tablets or smartphones, provide a presence-sensitive screen with which a user may interact. In order for a user to enter textual information into a mobile device, the mobile device may display a graphical (i.e., virtual) keyboard at the presence-sensitive screen with which the user may interact to enter text.

In some examples, the way in which a user holds a mobile device may not be conducive to interacting with a typical graphical keyboard. Using a typical graphical keyboard while holding the mobile device in one hand may make text entry more difficult as compared to holding the mobile device in both hands. An individual user may repeatedly make certain errors when typing on the graphical keyboard because of the placement of the graphical keyboard. For example, the actual key on the graphical keyboard that is activated by the user may be different from an intended target key. Additionally, the graphical keyboard layout may render input of certain keys strenuous or impossible based on the user's limited range of movement.

In one aspect of this disclosure, a computing device (e.g., a mobile phone, a tablet computer, etc.) may be enabled to determine a usage mode and usage location of a user based at least in part on a manner in which the user is holding the computing device and display a graphical keyboard at a presence-sensitive screen of the computing device corresponding to the determined usage mode and usage location. The usage mode and usage location are determined from received touch inputs at a plurality of touch sensors of the computing device. The touch sensors may be located in or on a housing of the computing device and may each be able to detect or otherwise receive touch input from the user. Based on the usage mode, the computing device may alter the display of a graphical keyboard at the presence-sensitive screen. For example, the computing device may display a graphical keyboard with a particular mechanical character layout (e.g., the traditional QWERTY keyboard layout), or may display separate left-hand characters at a left region of the presence-sensitive screen and right-hand characters at a right region of the presence-sensitive display. Based on the usage location, the computing device may display the graphical keyboard at different locations of the presence-sensitive screen. For example, if a user holds the computing device nearer to the bottom of the computing device, the computing device may display a graphical keyboard at a lower location of the presence-sensitive screen. In another example, the computing device may display the graphical keyboard at a different location of the presence-sensitive screen, in accordance with the user holding the computing device with different hand placement.

Another aspect of this disclosure may enable a computing device to determine an input mode of a user based on which hand a user employs to provide user input. The computing device may determine which hand is being used for user input by monitoring the received touch inputs and detecting any change in the received touch inputs at or near the same time as received user input. If a change in the received touch inputs is detected, the computing device may use the current usage mode to determine that the hand presumed to have caused the change is the hand with which the user is entering input. For example, if the computing device determines a left-handed usage mode (i.e., the user is holding the computing device with a left hand), and the computing device detects a change in the received touch inputs at or near the same time as received user input, the computing device may determine that the user is using the thumb of his or her left hand to enter input. In another example, if the computing device detects no change in the received touch inputs, the computing device may determine that the user is using his or her right hand to enter input.

Aspects of this disclosure may also enable a user to minimize inadvertent input. The computing device may minimize inadvertent input based upon received touch input. For example, in a one-handed usage mode, when the computing device receives user input corresponding to multiple character selections at or near the same time, the computing device may determine whether any change in received touch inputs occurred at or near the same time as the user input. When no change is determined, such as when the user has not activated any additional touch sensors, the computing device may accept each of the character selections as intentional user input. In another example, when the computing device determines a change in received touch inputs, such as when a user's palm has come in contact with a touch sensor while the user attempts to reach a certain element with his or her thumb, the computing device may refuse to accept certain selections as intentional user input (e.g., selections corresponding to an element located nearest to the newly-activated touch sensor).

The techniques of this disclosure may improve ease and speed of text entry by a user at a graphical keyboard by providing the user with different graphical keyboards for selecting characters based on different usage modes and usage locations of a device. Additionally, usage modes, usage locations, and input modes can be used to minimize inadvertent selection of elements, thereby enabling a user to more accurately select elements for user input. Techniques of this disclosure may decrease frustration associated with inaccuracies of user input on presence-sensitive screens and associated physical discomfort.

FIG. 1 is a conceptual diagram illustrating an example of a computing device 2 that may be configured to execute one or more applications and receive input, in accordance with one or more aspects of the present disclosure. Computing device 2 may be a stand-alone device, or may be part of a larger system. In some examples, computing device 2 may be a mobile device. Examples of computing device 2 include portable or mobile devices, such as mobile phones, tablet computers, smartphones, personal digital assistants (PDAs), portable gaming devices, portable media players, and e-book readers, as well as non-portable devices such as desktop computers. In some instances, computing device 2 may communicate with external, distinct devices via one or more networks, such as one or more wired or wireless networks, which may, in some cases, provide access to the Internet.

As shown in FIG. 1, computing device 2 includes touch sensors 4, usage mode module 6, interface manager 8, and one or more output devices 12. interface manager 8 further includes character mapping module 10. One of output devices 12 may display graphical user interface (GUI) 16 having keyboard sections 18A, 18B (collectively, "keyboard sections 18"). Keyboard sections 18A, 18B, collectively, may also be referred herein to as "graphical keyboard 18."

Output devices 12, in certain examples, may be configured to provide output to a user using tactile, audio, or video stimuli. Output devices 12 may include an input-sensitive display (e.g., touch-sensitive screen or presence-sensitive screen). That is, one or more of output devices 12 may also function as input devices. Output devices 12 may also include a video graphics adapter card, or any other type of device for converting a signal into an appropriate form understandable to humans or machines. Output devices 12 may present the content of computing device 2 to a user (e.g., GUI 16). For example, GUI 16 may display a web browser, or other output that may need to be presented to the user. As shown in FIG. 1, GUI 16 may, at times, include graphical keyboard 18.

In some examples, output devices 12 may include a presence-sensitive screen that can receive one or more user inputs, enabling a user's interaction with computing device 2. A user may interact with the presence-sensitive screen, displaying GUI 16, to select characters from graphical keyboard 18 or other elements of GUI 16. A user's selection of a keyboard character or other element may be received by the presence-sensitive screen and provided to interface manager 8.

Touch sensors 4 may be capable of receiving touch input from a user. Touch sensors 4 may include electrical devices such as capacitive sensors or resistive sensors, or may include mechanical devices such as switches or pressure plates. In one example, touch sensors 4 may include a plurality of simple capacitance sensors able to determine a change in the capacitance of a material. Electrical hardware attached to each one of the simple capacitance sensors may monitor the respective simple capacitance sensors for a change in capacitance. A change in capacitance may be determined by the attached electrical hardware and an indication may be output by the touch sensor. Other known sensor techniques providing the ability to sense touch input may also be employed to receive touch input from a user.

Touch sensors 4 may be located in or on a housing of computing device 2. For example, one or more touch sensors 4 may be located such that, when a user interacts with computing device 2 (e.g., by holding computing device 2), touch sensors 4 receive touch inputs at certain ones of touch sensors 4. Touch sensors 4 may provide the received touch inputs to computing device 2, or more specifically to usage mode module 6.

Usage mode module 6 may include hardware elements, software elements, or a combination thereof. Usage mode module 6 may receive one or more touch inputs from touch sensors 4. Based upon the received touch inputs, usage mode module 6 may determine the way in which a user is holding computing device 2. In one example, when holding computing device 2 with a single hand, a user may cause certain ones of touch sensors 4 to detect touch input. Touch sensors 4 may provide the detected touch inputs to usage mode module 6. Usage mode module 6 may determine that the received touch inputs correspond to a single-handed usage mode (e.g., a left-handed usage mode or a right-handed usage mode). In other examples, usage mode module 6 may determine that the received touch inputs correspond to a two-handed usage mode.

Based upon the received touch inputs, usage mode module 6 may also determine a usage location of the user's hands. That is, usage mode module 6 may determine both how a user is holding computing device 2 and at what location on computing device 2 the user is holding computing device 2. As one example, usage mode module 6 may determine that the user is holding computing device 2 near the bottom of the device. In another example, usage mode module 6 may determine that the user is holding computing device 2 near the top of the device.

Usage mode module 6 may receive user input (e.g., from interface manager 8). In various embodiments, usage mode module 6 may determine a input mode based on the received touch inputs, the determined usage mode, and the received user input. Usage mode module 6 may monitor the received touch inputs and, when a user makes a character selection or otherwise provides input (e.g., on a presence-sensitive screen), usage mode module 6 may determine whether a change occurred in the received touch inputs at or near the same time as the user input. In one example, when a single-handed usage mode is determined, and no change occurs in the received touch input, usage mode module 6 may determine that the user is using his or her free hand to provide user input on the presence-sensitive screen (i.e., a two-handed input mode). That is, the user is not making character selections or otherwise providing user input with the hand in which he or she is holding computing device 2. If a change does occur in the received touch inputs, usage mode module 6 may determine that the user is using the hand with which he or she is holding computing device 2 to make character selections or otherwise provide user input on the presence-sensitive screen (i.e. a single-handed input mode). When a two-handed usage mode is determined, usage mode module 6 may determine with which hand the user is providing user input on the presence-sensitive screen by determining which, if any, of the received touch inputs change at or near the same time as the user input is received. In other examples, usage mode module 6 may not determine an input mode when usage mode module 6 determines a two-handed usage mode. Usage mode module 6 may provide a usage mode, a usage location, and an input mode to interface manager 8.

Computing device 2 may be configured to execute interface manager 8, which may cause one or more of output devices 12 to display graphical keyboard 18 as part of GUI 16. Interface manager 8 may be operable by at least one processor of a computing system including computing device 2 to generate and cause output devices 12 to display graphical keyboard arrangements. Interface manager 8 may also be operable to receive character input from an input device of computing device 2 (e.g., an input/output device such as a presence-sensitive screen). In one example, output devices 12 may include a presence-sensitive screen, capable of providing input to interface manager 8 based on a user's selection of individual keys from graphical keyboard 18. Interface manager 8 may be, in some embodiments, a downloadable or pre-installed application executing on computing device 2. In another embodiment, interface manager 8 may be part of a hardware unit of computing device 2.

Character mapping module 10 of interface manager 8 may dictate the form and location of graphical keyboard 18. Based upon the usage mode, usage location, and input mode received from usage mode module 6, interface manager 8 may employ character mapping module 10 to determine the form in which to display graphical keyboard 18. In other words, interface manager 8 may cause output devices 12 to display, as part of GUI 16, graphical keyboard 18 as a unitary graphical keyboard or a bifurcated graphical keyboard, depending upon the usage mode received by interface manager 8 from usage mode module 6. Interface manager 8 may also cause output devices 12 to display graphical keyboard 18 at different locations of GUI 16, depending upon the usage location and input mode received by interface manager 8 from usage mode module 6.

In one example, a user may hold computing device 2 with two hands such that the user's thumbs are able to easily interact with an area of one of output devices 12 (e.g., a presence-sensitive screen) of computing device 2. Certain ones of touch sensors 4 may receive touch inputs from the user's hands. Touch sensors 4 may provide the received touch inputs to usage mode module 6. Based upon the received touch inputs, usage mode module 6 may determine that the user is interacting with computing device 2 in a two-handed usage mode. Usage mode module 6 may also determine a usage location of the user's hands on computing device 2 based upon the received touch inputs. Usage mode module 6 may or may not determine an input mode. Usage mode module 6 may provide interface manager 8 with the determined usage mode (i.e., two-handed usage mode), determined usage location (e.g., near a bottom portion of the presence-sensitive screen), and input mode. Character mapping module 10 of interface manager 8 may, based on the two-handed usage mode and the usage location, determine the form and location of graphical keyboard 18 to be a bifurcated graphical keyboard near the bottom portion of the presence-sensitive screen. Based upon instruction from character mapping module 10, interface manager 8 may cause output devices 12 to display a bifurcated graphical keyboard (e.g., keyboard sections 18A, 18B) as part of GUI 16. The displayed keyboard sections 18A, 18B may be at a location of GUI 16 such that individual keys of graphical keyboard 18 are within comfortable reach of the user's thumbs.

In other examples, the user may hold computing device 2 with one hand. Usage mode module 6 may determine a single-handed usage mode, a usage location, and a single-handed input mode. Character mapping module 10 may determine that a unitary graphical keyboard should be displayed as part of GUI 16. Based on instruction from character mapping module 10, interface manager 8 may cause output devices 12 to display a unitary graphical keyboard. Based on the usage location and single-handed input mode, the unitary graphical keyboard may be at a location of GUI 16 such that individual keys of the unitary graphical keyboard are within comfortable reach of the thumb of the hand with which the user is holding computing device 2. Alternatively, if a two-handed input mode was determined by usage mode module 6, individual keys of the unitary graphical keyboard may be within comfortable reach of the user's free hand.

Interface manager 8 may receive an indication of a selected element of GUI 16 or an activated key of keyboard 18 (e.g., in response to a user interacting with keyboard 18 displayed at the presence-sensitive screen). Interface manager 8 may then provide an indication of the selected element or activated key to various software applications of computing device 2. In some embodiments, interface manager 8 may distinguish a user's inadvertent user input from intentional user input based on at least one of the received usage mode, the received usage location, the received input mode, and the touch input received by usage mode module 6. That is, interface manager 8 may determine that a selection received as user input was not intentionally selected, but rather the element was accidentally selected. As one example, usage mode module 6 may determine a two-handed usage mode. Interface manager 8 may, at some time, receive simultaneous input for two separate characters of keyboard 18 (e.g., "Z" and "G" in FIG. 1). interface manager 8 may determine, based on the two-handed usage mode, that the user intentionally input the "G" character with a thumb, but inadvertently selected the "Z" character with a palm of the hand as well. Interface manager 8 may refrain from providing the character input associated with the user's selection of the "Z" character to the relevant software application of computing device 2.

In this manner, techniques of this disclosure may improve efficiency and usability by providing a user with a graphical keyboard better suited to a mode in which the user is holding a device. In other words, by determining how the user is holding and using the device, the type of graphical keyboard to be displayed and location at which to display the graphical keyboard can be modified by the device. For example, a user may hold the device in a two-handed mode and the device may display a bifurcated graphical keyboard at a presence-sensitive screen of the device, in an area of the presence-sensitive screen easily accessible by the user's hands. In another example, a user may hold the device in a one-handed mode and the device may display a unitary graphical keyboard at the presence-sensitive screen, in an area of the presence-sensitive screen easily accessible to one, the other, or both of the user's hands depending on the determined input mode. Additionally, the present disclosure may improve accuracy of user input. The device can use the determined mode in which the user is holding the device and providing input as well as the location of the user's hands to distinguish between the user's intentional user input and the user's inadvertent user input. That is, by determining how and where the user is holding the device, and how the user is providing input, the device can help the user avoid mistaken user input (e.g., selections made by the user's palm coming into contact with the presence-sensitive screen).

Figure 2:
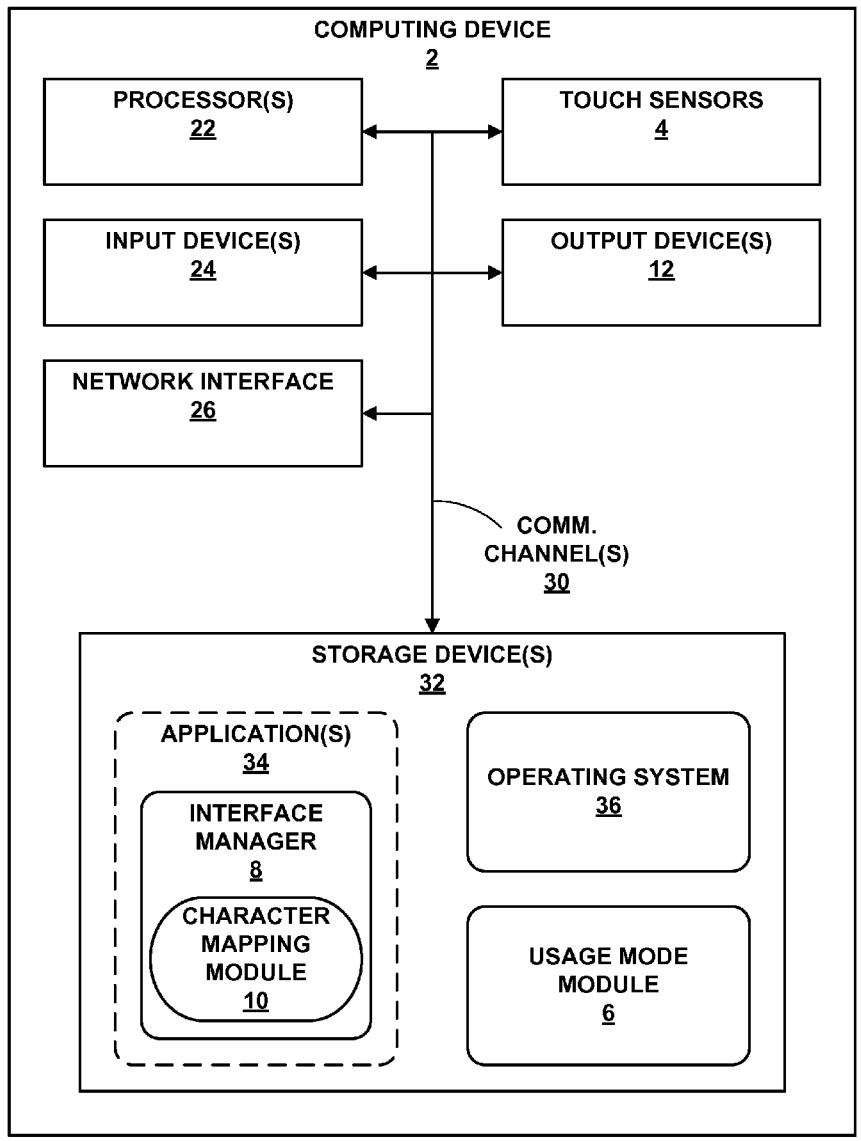
FIG. 2 is a block diagram illustrating further details of one example of the computing device shown in FIG. 1, in accordance with one or more aspects of the present disclosure.

FIG. 2 is a block diagram illustrating further details of one example of the computing device shown in FIG. 1, in accordance with one or more aspects of the present disclosure. FIG. 2 illustrates only one particular example of computing device 2, and many other example embodiments of computing device 2 may be used in other instances. As shown in the specific example of FIG. 2, computing device 2 includes one or more processors 22, a plurality of touch sensors 4, one or more input devices 24, one or more output devices 12, network interface 26, one or more communication channels 30 (COMM. CHANNEL(S)), and one or more storage devices 32. Computing device 2 also includes an operating system 36 which may include modules that are executable by computing device 2. Computing device 2 further includes one or more applications 34 and usage mode module 6. Applications 34, in one example, include interface manager 8, which is also executable by computing device 2. interface manager 8 includes character mapping module 10. Each of components 4, 6, 8, 10, 12, 22, 24, 26, 32, 34, and 36 may be interconnected (physically, communicatively, and/or operatively) for inter-component communications. In some examples, communication channels 30 may include a system bus, network connection, interprocess communication data structure, or any other channel for communicating data. As one example in FIG. 2, components 4, 12, 22, 24, 26, and 32 may be coupled by one or more communication channels 30.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For instance computing device 2 may not, in all examples, include network interface 26.

Although shown as a separate component in FIG. 2, in some examples, usage mode module 6 may be part of interface manager 8. In some examples, one or more of usage mode module 6, character mapping module 10, and one or more processors 22 may be formed in a common hardware unit. In certain examples, usage mode module 6 and/or character mapping module 10 may be software and/or firmware units that are executed on or operable by one or more processors 22.

One or more processors 22 may include, in certain examples, any one or more of a microprocessor, a controller, a digital signal processor (DSP), an application specific integrated circuit (ASIC), a field-programmable gate array (FPGA), or equivalent discrete or integrated logic circuitry. Processors 22 may be configured to implement functionality and/or process instructions for execution within computing device 2. For example, processors 22 may be capable of processing instructions stored in one or more storage devices 32.

Computing device 2 may also include a plurality of touch sensors 4 as one or more input devices 24. As described with respect to FIG. 1, touch sensors 4 may be capable of receiving touch input from a user and may include electrical devices such as capacitive sensors or resistive sensors, or may include mechanical devices such as switches or pressure plates. The ability to sense touch input may also be employed to receive touch input from a user. One or more input devices 24, in some embodiments, are configured to receive user input from a user through tactile, audio, or video feedback. Examples of input devices 24 include a touch-sensitive and/or a presence-sensitive screen, a touch-pad, a mouse, a keyboard, a voice responsive system, or any other type of device for detecting a command from a user.

One or more output devices 12 may also be included in computing device 2. Output devices 12, in various instances, are configured to provide output to a user using tactile, audio, or video stimuli. Examples of output devices 12 may include a touch-sensitive and/or presence-sensitive screen, a sound card, a video graphics adapter card, or any other type of device for converting a signal into an appropriate form understandable to humans or machines. Additional examples of output devices 12 may include a speaker, a cathode ray tube (CRT) monitor, a liquid crystal display (LCD), or any other type of device that can generate intelligible output to a user. In some examples, such as those where output devices 12 include a touch-sensitive or presence-sensitive screen, one or more of output devices 12 may also function as an input device (e.g., one of input devices 24).

In the example of FIG. 2, computing device 2 includes network interface 26. Computing device 2, in one example, uses network interface 26 to communicate with external devices via one or more networks, such as one or more wireless networks. Network interface 26 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 2 uses network interface 26 to wirelessly communicate with an external device (not shown) such as a server, mobile phone, or other networked computing device.

One or more storage devices 32, in one example, are configured to store information within computing device 2 during operation. Storage devices 32, in some examples, are described as a computer-readable storage medium. In some examples, storage devices 32 are a temporary memory, meaning that a primary purpose of storage devices 32 is not long-term storage. Storage devices 32, in some examples, are described as a volatile memory, meaning that storage devices 32 do not maintain stored contents when the computer is turned off. Examples of volatile memories include random access memories (RAM), dynamic random access memories (DRAM), static random access memories (SRAM), and other forms of volatile memories known in the art. In some examples, storage devices 32 are used to store program instructions for execution by one or more processors 22. Storage devices 32, in one example, are used by software or applications running on computing device 2 (e.g., interface manager 8) to temporarily store information during program execution.

Storage devices 32, in some examples, may be configured to store larger amounts of information. Storage devices 32 may further be configured for long-term storage of information. In some examples, storage devices 32 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Operating system 36 may control one or more functionalities of computing device 2 and/or components thereof. For example, operating system 36 may interact with applications 34, and may facilitate one or more interactions between applications 34 and processors 22, storage devices 32, input devices 24, and output devices 12. Operating system 36 may interact with or be otherwise coupled to applications 34, usage mode module 6 and components thereof. As shown in FIG. 2, operating system 36 and usage mode module 6 may be stored in storage devices 32, and may be operable by processors 22 to perform various tasks during execution.

Any applications or modules implemented within or executed by computing device 2 (e.g., applications 34, operating system 36, or usage mode module 6) may be implemented or contained within, operable by, executed by, and/or be operatively coupled to touch sensors 4, output devices 12, processors 22, input devices 24, network interface 26, and/or storage devices 32. During implementation or execution by processors 22, operating system 36 may provide information regarding one or more touch inputs from touch sensors 4 to usage mode module 6 (e.g., via communication channels 30). Operating system 36 may also be operable to provide information regarding user input from interface manager 8 to usage mode module 6.

In some examples, usage mode module 6 may be included in operating system 36. In other examples, usage mode module 6 may be part of one or more of applications 34. Implementation or execution by processors 22 may cause usage mode module 6 to determine a usage mode of computing device 2 based upon the received touch input information. That is, usage mode module 6 may analyze the received touch input information and determine the way in which a user of computing device 2 is holding computing device 2. Processors 22 may operate usage mode module 6 to determine a usage location of a user's hands with respect to computing device 2. Usage mode module 6 may also be operable to determine a user's mode of providing user input based on the received touch inputs and the received user input. In other words, usage mode module 6 may determine the way in which the user is using computing device 2, the location at which the user is placing his or her hand(s) on computing device 2, and the way in which the user is providing user input to computing device 2. Operating system 36 may provide an indication of the determined usage mode, usage location, and input mode to one or more of applications 34 (e.g., interface manager 8).

One example of interface manager 8 is shown in FIG. 1. Interface manager 8 may include character mapping module 10. Interface manager 8 may provide or display graphical keyboard 18 shown in FIG. 1 (e.g., at output devices 12 as part of GUI 16). Interface manager 8 may be stored in storage devices 32, and may be operable by processors 22 to perform various tasks during execution.

During implementation or execution of interface manager 8, character mapping module 10 may be operable by processors 22 to determine a layout for a graphical keyboard (e.g., graphical keyboard 18). Based at least in part upon the determined usage mode, character mapping module 10 may determine a layout for use by interface manager 8. For example, when a two-handed usage mode is determined, character mapping module 10 may determine that interface manager 8 should use a bifurcated graphical keyboard. If a single-handed usage mode is determined (e.g., a left-handed usage mode or a right-handed usage mode), character mapping module 10 may determine that interface manager 8 should use a unitary graphical keyboard. Character mapping module 10 may provide an indication of the determined layout to interface manager 8.

Interface manager 8 may receive the indication of the determined graphical keyboard layout and may cause an output device 12 (e.g., a presence-sensitive screen) to output the determined keyboard layout. That is, interface manager 8 may instruct an output device 12 to display either a unitary graphical keyboard or a bifurcated graphical keyboard. If, for example, usage mode module 6 determines a two-handed usage mode, interface manager 8 may cause an output device 12 to display a bifurcated graphical keyboard (e.g., keyboard sections 18A, 18B) as part of GUI 16.

Based at least in part upon the determined usage location and input mode, character mapping module 10 may determine a location or region on an output device 12 at which output device 12 displays graphical keyboard 18. Character mapping module 10 may instruct interface manager 8 to display graphical keyboard 18 at various locations of output devices 12.

Interface manager 8 may be further operable by processors 22 to receive user input. For example, a user may provide a character selection at an output device 12 (e.g., a presence-sensitive screen) corresponding to a character displayed by graphical keyboard 18. The presence-sensitive screen may provide some indication of the character selection to interface manager 8 (e.g., via communication channels 30). Interface manager 8 may subsequently generate data representing the received character selection and provide the generated data to operating system 36, usage mode module 6, or other ones of applications 34 executing on computing device 2.

In some examples, execution or implementation of interface manager 8 may further determine if provided user input was unintentional or erroneous, based on at least one of a determined usage mode of computing device 2, a determined usage location, and a determined input mode. That is, execution or implementation of interface manager 8 may include analyzing received user input for inadvertent selections. For example, if interface manager 8 determines that the provided user input was unintentional or erroneous, interface manager 8 may refrain from generating data representing the user input.

As discussed herein, the touch-input based usage mode determination and usage location determination, as well as the input mode determination and variable keyboard layout of the present disclosure may increase the utility of a displayed graphical keyboard. Displaying different keyboards for different usage modes and usage locations may reduce the strain users incur during character input and allow a user to comfortably select characters without having to change positioning of their hands. Additionally, the usage mode, usage location, and input mode may be used to distinguish an inadvertent user input from an intentional user input. As a result, in some instances, the presence-sensitive screen may display more accessible characters and elements while reducing the risk of inaccuracies.

Figure 3B:
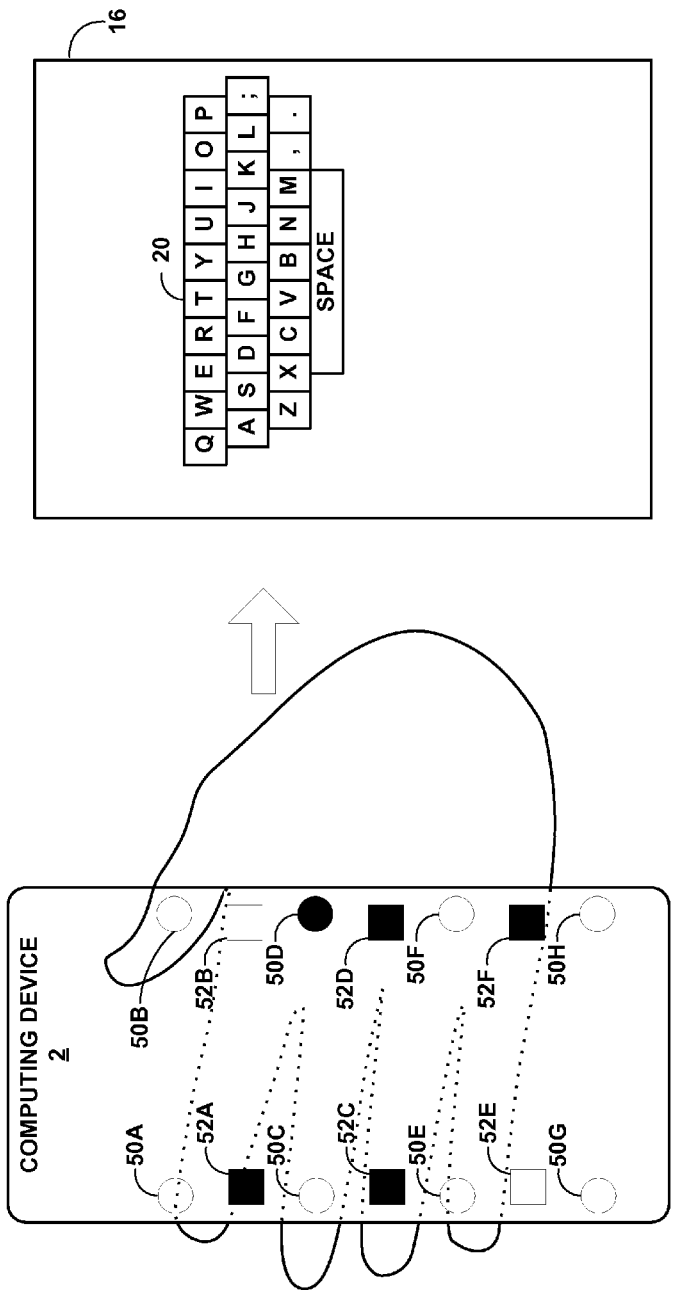
Figure 3C:
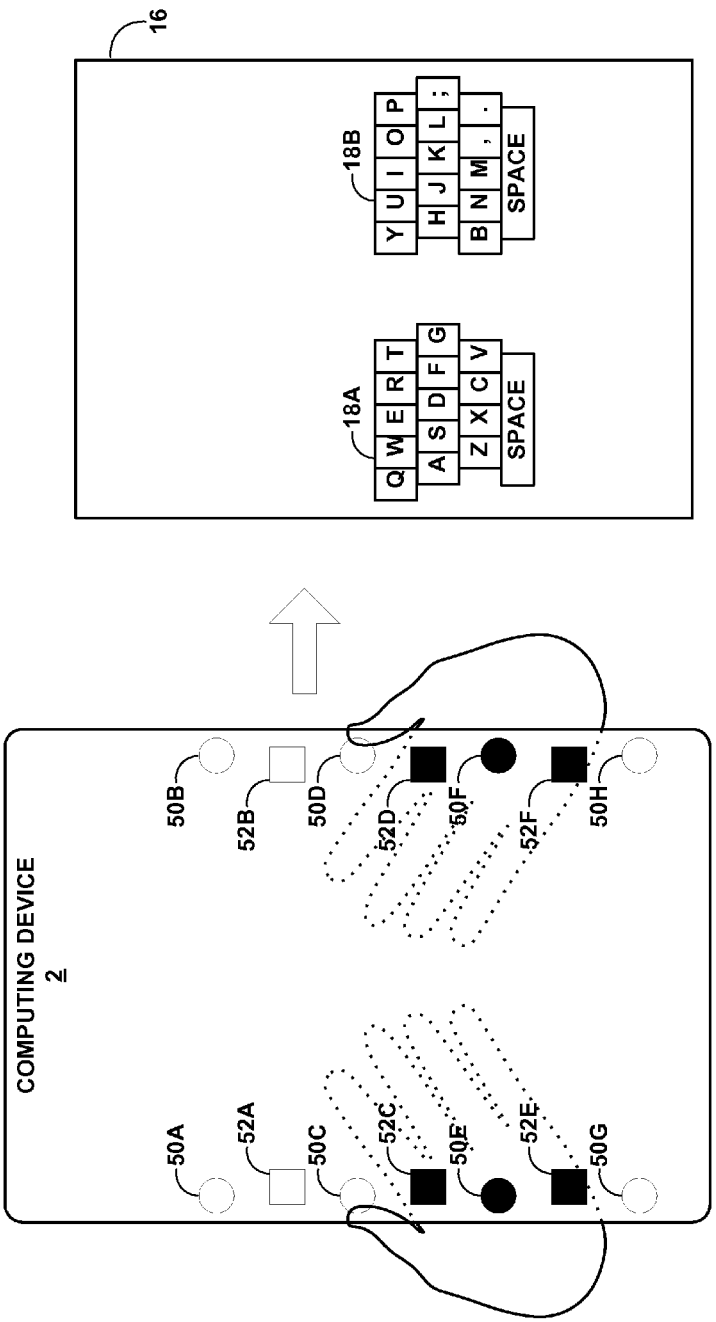

FIGS. 3A-3C are conceptual diagrams illustrating an example computing device for displaying a graphical keyboard at a presence-sensitive screen, in accordance with one or more aspects of the present disclosure. For the purposes of illustration only, the example computing device is described below within the context of computing device 2 of FIG. 1 and FIG. 2. FIGS. 3A-3C illustrate only one particular example of computing device 2, and many other example embodiments of computing device 2 may be used in various instances.

As shown in FIGS. 3A-3C, computing device 2 includes multiple touch sensors 4 displayed as frontal touch sensors 50A-H (collectively "frontal touch sensors 50"). In FIGS. 3A-3C, touch sensors 4 of computing device 2 also include multiple rear touch sensors 52A-F (collectively "rear touch sensors 52"). As shown in FIGS. 3A-3C, frontal touch sensors 50 are located in or on a front of computing device 2, on both a left and right side of computing device 2, while rear touch sensors 50 are located in or on a back housing of computing device 2, on both a left and right side of computing device 2. However, the specific number, location, and arrangement of frontal touch sensors 50 and rear touch sensors 52 may be altered in various implementations, to better determine usage mode, usage location, and input mode in accordance with the present disclosure. For example, while FIGS. 3A-3C show computing device 2 including touch sensors 4 on both a front and a back housing, in other embodiments only touch sensors on a front housing or only on a back housing may be used.

Those touch sensors 4 detecting touch input are shown as black (i.e., frontal touch sensor 50E and rear touch sensors 52C-52F in FIG. 3A). Those touch sensors 4 not currently detecting any touch input are shown as white (i.e., frontal touch sensors 50A-50D, 50E-H and rear touch sensors 52A, 52B in FIG. 3A). A particular combination of those touch sensors 4 detecting touch input and those touch sensors detecting no touch input may correspond to a specific usage mode and usage location. For example, the touch sensors 4 detecting touch inputs as shown in FIG. 3A may correspond to a user holding computing device 2 with his or her left hand only. Based upon the received touch inputs, usage mode module 6 of computing device 2 may determine that computing device 2 is being used in a single-handed usage mode. More specifically, usage mode module 6 may determine, as shown in FIG. 3A, that computing device 2 is being used in a left-handed usage mode, with the user's hand in a usage location nearer the bottom of computing device 2. That is, in the example of FIG. 3A, usage mode module 6 may define a left-handed usage mode to correspond to when those rear touch sensors 52 detecting input are located on both a left and a right side of computing device 2, but those frontal touch sensors 50 detecting input are only located on a left side of computing device 2.

Upon input manager 8 receiving user input (e.g., from a presence-sensitive screen of computing device 2) and providing it to usage mode module 6, usage mode module 6 may also determine an input mode. As shown in FIG. 3A, the user may use his or her right hand to provide user input, and usage mode module 6 would determine a two-handed input mode. In another example, the user may use his or her left thumb (i.e., the thumb shown in FIG. 3A) to provide user input, and usage mode module 6 would determine a single-handed input mode.

Interface manager 8 may cause output devices 12 (e.g., a presence-sensitive screen) to display graphical keyboard 18 as part of GUI 16. As shown in FIG. 3A, based at least in part on the determined usage mode, usage location, and a two-handed input mode, GUI 16 may include left-weighted graphical keyboard 19, located such that the user may be able to comfortably select each key displayed as part of left-weighted graphical keyboard 19 using his or her right hand. In other examples, where usage mode module 6 determines a single-handed input mode, left-weighted graphical keyboard 19 may be located such that the user may be able to comfortably select each key using the thumb of his or her left hand. In the example shown in FIG. 3A, left-weighted graphical keyboard 19 is displayed near a left edge of GUI 16. However, in other examples, left-weighted graphical keyboard 19 may be displayed nearer to a center or nearer to a right edge of GUI 16.

As shown in FIG. 3B, a different example combination of touch sensors 4 detecting touch input and touch sensors 4 receiving no touch input may be encountered. In FIG. 3B, frontal touch sensor 50D and rear touch sensors 52A, 52C, 52D and 52F are shown as detecting touch input. The touch inputs as shown in FIG. 3B may correspond to a user holding computing device 2 with his or her right hand only. Based upon the received touch inputs, usage mode module 6 may determine that computing device 2 as shown in FIG. 3B is being used in a right-handed usage mode, with the user's hand in a location more toward the middle of computing device 2. That is, in the example of FIG. 3B, usage mode module 6 may define a right-handed usage mode to correspond to when those rear touch sensors 52 detecting input are located on both a left and a right side of computing device 2, but those frontal touch sensors 50 detecting input are only located on a right side of computing device 2.

Usage mode module 6 may receive user input (e.g., from interface manager 8) provided by the user's right thumb and also determine a single-handed input mode. Based at least in part on the determined usage mode, usage location, and input mode, GUI 16 may include right-weighted graphical keyboard 20 such that each displayed key of right-weighted graphical keyboard 20 is comfortably accessible by the thumb of the user's right hand. In the example shown in FIG. 3B, right-weighted graphical keyboard 20 is displayed near a right edge of GUI 16. However, in other examples, right-weighted graphical keyboard 20 may be displayed nearer to a center or nearer to a left edge of GUI 16.

Output devices 12 (e.g., a presence-sensitive screen) may receive one or more selections corresponding to user input. Each selection may correspond to a character displayed as part of graphical keyboard 18 or other element of GUI 16. The presence-sensitive screen may provide user input information to interface manager 8. Upon receiving user input information, interface manager 8 may distinguish inadvertent user input from intentional user input, based at least in part upon one or more of the received usage mode, the received usage location, the received input mode, and the received touch inputs.

In some embodiments, interface manager 8 may determine erroneous user input based in part on the input mode. As one example, a user may hold computing device 2 in a right hand, at a location near the middle of computing device 2 (e.g., in accordance with the touch input as shown in FIG. 3B). The user may employ a single-handed input mode. That is, the user may use his or her right hand to interact with right-weighted graphical keyboard 20 to input the "E" key and the "." key at or near the same time. When receiving user input information from the presence-sensitive screen for these user inputs, interface manager 8 may compare currently detected touch inputs to the touch inputs detected prior to the user inputs. If certain ones of touch sensors 4 were not previously detecting touch input, but now are detecting touch input (e.g., if frontal touch sensor 50F of FIG. 3B is now additionally detecting touch input), interface manager 8 may determine that user input information relating to selection of the "E" key was intentional, and provide the user input to one or more of operating system 36 or applications 34. However, based on the determined input mode and change in detected touch inputs, interface manager 8 may determine that user input information relating to the "." key was caused by the palm of the user's right hand, and thus erroneous. In the case of erroneous user input, interface manager 8 may discard the user input, and refrain from providing associated user input information to operating system 36, usage mode module 6, or applications 34.

In other embodiments, interface manager 8 may differentiate intentional user input from inadvertent or erroneous user input based on the current usage mode of computing device 2. As an example, in a two-handed usage mode, interface manager 8 may determine that any user input received near a left or right edge of GUI 16, when received at or near the same time as user input received more inbounds from the edge of GUI 16, is erroneous and should be discarded. Interface manager 8 may monitor the received touch inputs, and only determine erroneous user input when additional touch inputs are received at or near the same time as the user input. For example, erroneous user input may be determined when there is a change in the received touch inputs at or near the same time as the received user input, regardless of the usage mode and input mode.

FIG. 3C shows another example combination of touch sensors 4 detecting touch input and touch sensors 4 detecting no touch input. In FIG. 3C, only rear touch sensors 52C-52F and frontal touch sensors 50E-50F are detecting touch input. The touch inputs as shown in FIG. 3C may correspond to a user holding computing device 2 with both of his or her hands. Based upon the received touch inputs, usage mode module 6 may determine that computing device 2 is being used in a two-handed usage mode and that the user's hands are nearer the bottom of computing device 2. That is, in the example of FIG. 3C, usage mode module 6 may define a two-handed usage mode to correspond to when those rear touch sensors 52 detecting input are located on both a left and a right side of computing device 2, and those frontal touch sensors 50 detecting input are also located on both a left and a right side of computing device 2. Based upon the determined usage mode and usage location, GUI 16 may include keyboard sections 18 such that each key of keyboard section 18A is easily accessible by the user's left thumb, and each key of keyboard section 18B is easily accessible by the user's right thumb.

Interface manager 8 may differentiate intentional user input from erroneous or inadvertent user input in a two-handed usage mode as well. Similar to when a one-handed usage mode is determined, interface manager 8 may determine erroneous input in a two-handed usage mode based at least in part on one of the usage mode, the usage location, the input mode, and the received touch inputs. For example, in a two-handed usage mode, interface manager 8 may receive information from usage mode module 6 indicating that a user provided user input using his or her left hand. That is, interface manager 8 may receive a left-hand input mode indication from usage mode module 6. Based on the input mode information, interface manager may determine that user input received close to a left edge of GUI 16, received at or near the same time as other user input received more inbounds, may be erroneous.

Figure 4:
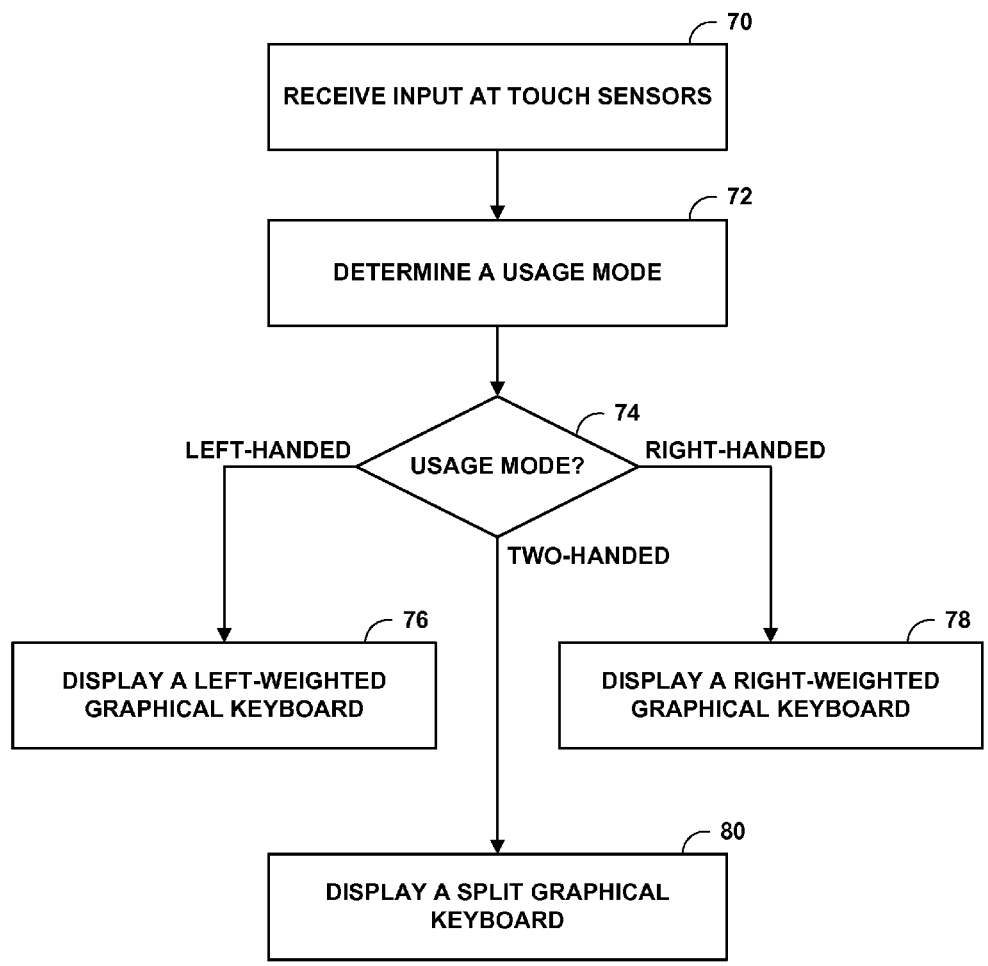
FIG. 4 is a flow diagram illustrating an example process that may be used to display a graphical keyboard at a presence-sensitive screen, in accordance with one or more aspects of the present disclosure.

FIG. 4 is a flow diagram illustrating an example process that may be used to display a graphical keyboard at a presence-sensitive screen, in accordance with one or more aspects of the present disclosure. For purposes of illustration only, the example method illustrated in FIG. 4 is described below within the context of computing device 2 of FIG. 1 and FIG. 2. The example process described below may be performed by computing device 2 shown in FIG. 1 and FIG. 2.

The process of FIG. 4 includes receiving, by computing device 2 having a presence-sensitive screen (e.g., one of output devices 12) and a housing, the housing further having a plurality of touch sensors 4, input at one or more of touch sensors 4 from the plurality of touch sensors 4 (80). That is, touch sensors 4 of computing device 2 may detect touch inputs at touch sensors 4 (e.g., when a user holds computing device 2). Touch sensors 4 may send an indication of the detected touch inputs to usage mode module 6.

The process of FIG. 4 also includes determining, by computing device 2, based at least in part on the received touch inputs, a usage mode, wherein the usage mode includes at least one of a one-handed usage mode, and a two-handed usage mode (82). That is, usage mode module 6 may use the touch inputs received from touch sensors 4 to determine the mode in which a user is using computing device 2. If the received touch inputs correspond to a left-handed usage mode (e.g., as shown in FIG. 3A), usage mode module 6 may determine a left-handed usage mode. For example, if the received touch inputs include touch input detected at rear touch sensors 52 on both a left and a right side of computing device 2, as well as at frontal touch sensors 50 on only a left side, usage mode module 6 may determine a left-handed usage mode. If the received touch inputs correspond to a right-handed usage mode (e.g., as shown in FIG. 3B), usage mode module 6 may determine a right-handed usage mode. For example, if the received touch inputs include touch input detected at rear touch sensors 52 on both the left and right sides of computing device 2, as well as at frontal touch sensors 50 on only the right side, usage mode module 6 may determine a right-handed usage mode. If, however, the received inputs correspond to a two-handed usage mode (e.g., as shown in FIG. 3C), usage mode module 6 may determine a two-handed usage mode. As an example, if the received touch inputs include touch input detected at rear touch sensors 52 on both the left and right sides of computing device 2, and touch input detected at frontal touch sensors 50 on both the left and right sides of computing device 2, usage mode module 6 may determine a two-handed usage mode. Usage mode module 6 may send an indication of the determined usage mode to interface manager 8.

The process of FIG. 4 further includes displaying, based at least in part on the determined usage mode, graphical keyboard 18 at the presence-sensitive screen, wherein, if the determined usage mode is the left-handed usage mode ("LEFT-HANDED" branch of 74), graphical keyboard 18 is displayed as a left-weighted graphical keyboard (76). For example, character mapping module 10 of interface manager 8 may determine a layout of graphical keyboard 18 based on the usage mode received from usage mode module 6. If a left-handed usage mode is received, character mapping module 10 may instruct interface manager 8 to use a left-weighted graphical keyboard layout. Interface manager 8 may cause the presence-sensitive screen to display a unitary, left-weighted graphical keyboard (e.g., left-weighted graphical keyboard 19) as part of GUI 16.

If the determined usage mode is the right-handed usage mode ("RIGHT-HANDED" branch of 74), graphical keyboard 18 is displayed as a right-weighted graphical keyboard (78). As one example, if character mapping module 10 receives a right-handed usage mode from usage mode module 6, character mapping module 10 may instead instruct interface manager 8 to use a right-weighted graphical keyboard layout. Interface manager 8 may cause the presence-sensitive screen to display a unitary, right-weighted graphical keyboard (e.g., right-weighted graphical keyboard 20) as part of GUI 16.

If the determined usage mode is the two-handed usage mode ("TWO-HANDED" branch of 74), graphical keyboard 18 is displayed as a split, or bifurcated graphical keyboard (80). That is, if character mapping module 10 receives a two-handed usage mode from usage mode module 6, character mapping module 10 may instruct interface manager 8 to use a split, or bifurcated graphical keyboard layout. Interface manager 8 may cause the presence-sensitive screen to display a bifurcated graphical keyboard (e.g., keyboard sections 18) as part of GUI 16.

In one example, the process includes determining, based on a location of each of the one or more touch sensors at which the touch input is received, a usage location, determining, based at least in part on the usage location, a position on the presence-sensitive screen at which to display the graphical keyboard, and displaying the graphical keyboard at the determined position.

In one example, the process includes detecting, at the presence-sensitive screen, two or more user inputs, each user input of the two or more user inputs detected at a respective location of the presence-sensitive screen, determining, based at least in part on the respective locations and the determined usage-mode, that at least one user input of the two or more user inputs is an unintentional user input, and discarding the at least one unintentional user input.

In one example, determining that the at least one user input of the two or more user inputs is the unintentional user input includes determining a left-handed usage mode, detecting, with the presence-sensitive screen, the at least one user input of the two or more user inputs at a location proximate to a left edge of the presence-sensitive screen, and determining that the at least one user input of the two or more user inputs detected at the location proximate to the left edge of the presence-sensitive screen is the unintentional user input.

In one example, determining that the at least one user input of the two or more user inputs is the unintentional user input includes determining a right-handed usage mode, detecting, with the presence-sensitive screen, the at least one user input of the two or more user inputs at a location proximate to a right edge of the presence-sensitive screen, and determining that the at least one user input of the two or more user inputs detected at the location proximate to the right edge of the presence-sensitive screen is the unintentional user input.

In one example, determining that the at least one user input of the two or more user inputs is the unintentional user input includes determining a two-handed usage mode, detecting, with the presence-sensitive screen, the at least one user input of the two or more user inputs at a location proximate to a left edge or a right edge of the presence-sensitive screen, and determining that the at least one user input of the two or more user inputs detected at the location proximate to the left edge or the right edge of the presence-sensitive screen is the unintentional user input.

In one example, the process includes detecting, at the presence-sensitive screen, two or more user inputs, each user input of the two or more user inputs detected at a respective location of the presence-sensitive screen, determining, by an interface manager of the computing device and based at least in part on the respective locations and the determined usage mode, that at least one user input of the two or more user inputs is an intentional user input, and providing, by the interface manager, the intentional user input to a software application executing at the computing device.

In one example, at least one touch sensor from the plurality of touch sensors is located on a front surface of the housing. That is, touch sensors 4 may include frontal touch sensors 50. In another example, at least one touch sensors from the plurality of touch sensors is located on a rear surface of the housing. That is, touch sensors 4 may include rear touch sensors 52.

In one example, the split graphical keyboard includes a left portion of a QWERTY-type keyboard layout and a right portion of a QWERTY-type keyboard layout. In another example, the unitary graphical keyboard includes a QWERTY-type keyboard layout.

In one example, determining the usage mode includes receiving, by the computing device, touch input from at least one touch sensor located on a left side of a rear surface of the housing, from at least one touch sensor located on a right side of the rear surface of the housing, and at least one touch sensor located on a left side of a front surface of the housing. Determining the usage mode also includes determining, based at least in part on the received touch input, that the usage mode is a left-handed usage mode. Additionally, displaying the graphical keyboard includes displaying a left-weighted graphical keyboard at the presence-sensitive screen.

In one example, determining the usage mode includes receiving, by the computing device, touch input from at least one touch sensor located on a left side of a rear surface of the housing, from at least one touch sensor located on a right side of the rear surface of the housing, and at least one touch sensor located on a right side of a front surface of the housing. Determining the usage mode also includes determining, based at least in part on the received touch input, that the usage mode is a right-handed usage mode. Additionally, displaying the graphical keyboard includes displaying a right-weighted graphical keyboard at the presence-sensitive screen.

In one example, determining the usage mode includes receiving, by the computing device touch input from at least one touch sensor located on a left side of a rear surface of the housing, from at least one touch sensor located on a right side of the rear surface of the housing, from at least one touch sensor located on a left side of a front surface of the housing, and from at least one touch sensor located on a right side of the front surface of the housing; and determining, based at least in part on the received touch input, that the usage mode is a two-handed usage mode.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
    receiving, by one or more touch sensors from a plurality of touch sensors at a housing of a computing device, a touch input indicating a usage mode;
    determining, based at least in part on the touch input and by the computing device, the usage mode, wherein the usage mode includes at least one of a one-handed usage mode, and a two-handed usage mode; and
    displaying, based at least in part on the usage mode, a graphical keyboard at a presence-sensitive screen of the computing device, wherein, if the usage mode is the one-handed usage mode, the graphical keyboard is displayed as a unitary graphical keyboard, and wherein, if the usage mode is the two-handed usage mode, the graphical keyboard is displayed as a split graphical keyboard.

2. The method of claim 1, further comprising:
    determining, based on a location of each of the one or more touch sensors at which the touch input is received, a usage location;
    determining, based at least in part on the usage location and by the computing device, a position on the presence-sensitive screen at which to display the graphical keyboard; and
    displaying the graphical keyboard at the position.

3. The method of claim 1, further comprising:
    detecting, at the presence-sensitive screen, two or more user inputs, each user input of the two or more user inputs detected at a respective location of the presence-sensitive screen;
    determining, based at least in part on the respective locations and the usage mode and by the computing device, that at least one user input of the two or more user inputs is an unintentional user input; and
    discarding the at least one unintentional user input.

4. The method of claim 3, wherein determining that the at least one user input of the two or more user inputs is the unintentional user input comprises:
    determining a left-handed usage mode;
    detecting, at the presence-sensitive screen and by the computing device, the at least one user input of the two or more user inputs at a location between a left edge of the presence-sensitive screen and other user inputs of the two or more user inputs; and
    determining, by the computing device, that the at least one user input of the two or more user inputs detected at the location is the unintentional user input.

5. The method of claim 3, wherein determining that the at least one user input of the two or more user inputs is the unintentional user input comprises:
    determining a right-handed usage mode;
    detecting, at the presence-sensitive screen, the at least one user input of the two or more user inputs at a location between a right edge of the presence-sensitive screen and other user inputs of the two or more user inputs; and
    determining, by the computing device, that the at least one user input of the two or more user inputs detected at the location is the unintentional user input.

6. The method of claim 3, wherein determining that the at least one user input of the two or more user inputs is the unintentional user input comprises:
    determining a two-handed usage mode;
    detecting, at the presence-sensitive screen, the at least one user input of the two or more user inputs at one of 1) a first location between a left edge of the presence-sensitive screen and other user inputs detected at a second location more inbounds from the left edge of the presence-sensitive screen than the first location and 2) the third location between a right edge of the presence-sensitive screen and other user inputs detected at a fourth location more inbounds from the right edge of the presence-sensitive screen than the third location; and
    determining, by the computing device, that the at least one user input of the two or more user inputs is the unintentional user input.

7. The method of claim 1, further comprising:
    detecting, at the presence-sensitive screen, two or more user inputs, each user input of the two or more user inputs detected at a respective location of the presence-sensitive screen;
    determining, based at least in part on the respective locations and the usage mode and by an interface manager of the computing device, that at least one user input of the two or more user inputs is an intentional user input; and providing, by the interface manager, the intentional user input to a software application executing at the computing device.

8. The method of claim 1, wherein receiving the touch input comprises receiving, by the computing device, touch input from at least one touch sensor located on a left side of a rear surface of the housing, from at least one touch sensor located on a right side of the rear surface of the housing, and from at least one touch sensor located on a left side of a front surface of the housing, wherein determining the usage mode comprises determining, based at least in part on the touch input, that the usage mode is a left-handed usage mode, and wherein displaying the graphical keyboard comprises displaying a left-weighted graphical keyboard at the presence-sensitive screen.

9. The method of claim 1, wherein receiving the touch input comprises receiving, by the computing device, touch input from at least one touch sensor located on a left side of a rear surface of the housing, from at least one touch sensor located on a right side of the rear surface of the housing, and from at least one touch sensor located on a right side of a front surface of the housing, wherein determining the usage mode comprises determining, based at least in part on the touch input, that the usage mode is a right-handed usage mode, and wherein displaying the graphical keyboard comprises displaying a right-weighted graphical keyboard at the presence-sensitive screen.

10. The method of claim 1, wherein receiving the touch input comprises receiving, by the computing device, touch input from at least one touch sensor located on a left side of a rear surface of the housing, from at least one touch sensor located on a right side of the rear surface of the housing, from at least one touch sensor located on a left side of a front surface of the housing, and from at least one touch sensor located on a right side of the front surface of the housing, and wherein determining the usage mode comprises determining, based at least in part on the touch input, that the usage mode is a two-handed usage mode.

11. The method of claim 1 wherein at least one touch sensor from the plurality of touch sensors is located on a front surface of the housing.

12. The method of claim 1 wherein at least one touch sensor from the plurality of touch sensors is located on a rear surface of the housing.

13. The method of claim 1 wherein the split graphical keyboard comprises a left portion of a QWERTY-type keyboard layout and a right portion of a QWERTY-type keyboard layout.

14. The method of claim 1, wherein the unitary graphical keyboard comprises a QWERTY-type keyboard layout.

15. A computing device comprising:

one or more processors;

a presence-sensitive screen;

a housing having a plurality of touch sensors;

a usage mode module operable by the one or more processors to receive a touch input at one or more touch sensors from the plurality of touch sensors, the touch input indicating a usage mode, and determine, based at least in part on the touch input, a usage mode, wherein the usage mode includes at least one of a one-handed usage mode, and a two-handed usage mode; and an interface manager operable by the one or more processors to display, based at least in part on the usage mode, a graphical keyboard at the presence-sensitive screen, wherein if the usage mode is the one-handed usage mode, the graphical keyboard is displayed as a unitary graphical keyboard, and wherein, if the usage mode is the two-handed usage mode, the graphical keyboard is displayed as a split graphical keyboard.

16. The computing device of claim 15, wherein the usage mode module is further operable by the one or more processors to determine, based on a location of each of the one or more touch sensors at which the touch input is received, a usage location, and wherein the interface manager is further operable by the one or more processors to determine, based at least in part on the usage location, a position on the presence-sensitive screen at which to display the graphical keyboard, and display the graphical keyboard at the position.

17. The computing device of claim 15, wherein the interface manager is further operable by the one or more processors to:

detect, at the presence-sensitive screen, two or more user inputs, each user input of the two or more user inputs detected at a respective location of the presence-sensitive screen;

determine, based at least in part on the respective locations and the usage mode, that at least one user input of the two or more user inputs is an unintentional user input; and discard the at least one unintentional user input.

18. A computer-readable storage medium comprising instructions that, when executed, cause one or more processors of a computing device to perform operations comprising:

receiving touch input at one or more touch sensors from a plurality of touch sensors included in a housing of the computing device, the touch input indicating a usage mode;

determining, based at least in part on the touch input, a usage mode, wherein the usage mode includes at least one of a one-handed usage mode, and a two-handed usage mode; and displaying, based at least in part on the usage mode, a graphical keyboard at a presence-sensitive screen of the computing device, wherein, if the usage mode is the one-handed usage mode, the graphical keyboard is displayed as a unitary graphical keyboard, and wherein, if the usage mode is the two-handed usage mode, the graphical keyboard is displayed as a split graphical keyboard.

19. The computer-readable storage medium of claim 18, wherein the operations further comprise:

determining, based on a location of each of the one or more touch sensors at which the touch input is received, a usage location;

determining, based at least in part on the usage location, a position on the presence-sensitive screen at which to display the graphical keyboard; and displaying the graphical keyboard at the position.

20. The computer-readable storage medium of claim 18, wherein the operations further comprise:

detecting, at the presence-sensitive screen, two or more user inputs, each user input of the two or more user inputs detected at a respective location of the presence-sensitive screen;

determining, based at least in part on the respective locations and the usage mode, that at least one user input of the two or more user inputs is an unintentional user input; and discarding the at least one unintentional user input.

* * * * *